July 1, 1930.  J. FLAMMANG  1,769,020

TRUNK PISTON

Filed June 18, 1927

Inventor:
John Flammang,
His Attorney

Patented July 1, 1930

1,769,020

UNITED STATES PATENT OFFICE

JOHN FLAMMANG, OF UNIVERSITY CITY, MISSOURI, ASSIGNOR, BY MESNE ASSIGNMENTS, TO THE STERLING CORPORATION, OF WILMINGTON, DELAWARE, A CORPORATION OF DELAWARE

TRUNK PISTON

Application filed June 18, 1927. Serial No. 199,661.

This invention pertains to pistons, more particularly as used in internal combustion engines.

In the operation of an internal combustion engine, the weight of the piston plays an important part in determining the power which the engine will deliver, particularly at high speeds. This is because the piston must be accelerated to a high speed and then stopped and reversed in its direction of movement. These reversals take place in very rapid succession. The inertia of the piston absorbs a considerable percentage of the power of the engine during these reversals of movement. It has been proposed to overcome this difficulty by constructing the piston of a light material so as to reduce its inertia to a minimum. The material most easily adapted to this purpose, on account of its lightness and its cheapness, is aluminum or its alloys. These materials, however, have a high co-efficient of thermal expansion so that under operating conditions the piston will expand more rapidly than the cylinder within which it is expected to work. This causes difficulty due to the liability of the piston binding in the cylinder on account of its expansion. If sufficient clearance is allowed between piston and cylinder to avoid binding, the piston becomes too loose for satisfactory operation when the engine is cool. Various means for overcoming this difficulty have been proposed, such as making the piston in such form as to be resilient.

One of the objects of this invention is to provide a piston which may be constructed of light material of high thermal expansion, but in which means are provided to form a suitable bearing for the piston on the cylinder wall, the fit of which will be practically constant, irrespective of the temperature.

Another object is to provide a piston of material having high thermal expansion with means for limiting the expansion of the bearing part thereof so as to provide a substantially constant bearing between piston and cylinder.

Another object is to provide a piston which may be constructed of highly expansible metal and which is provided with bearing elements supported in such a manner as to limit the expansion of the latter.

Further objects will appear from the following description, taken in connection with the accompanying drawing, in which—

Figure 1:
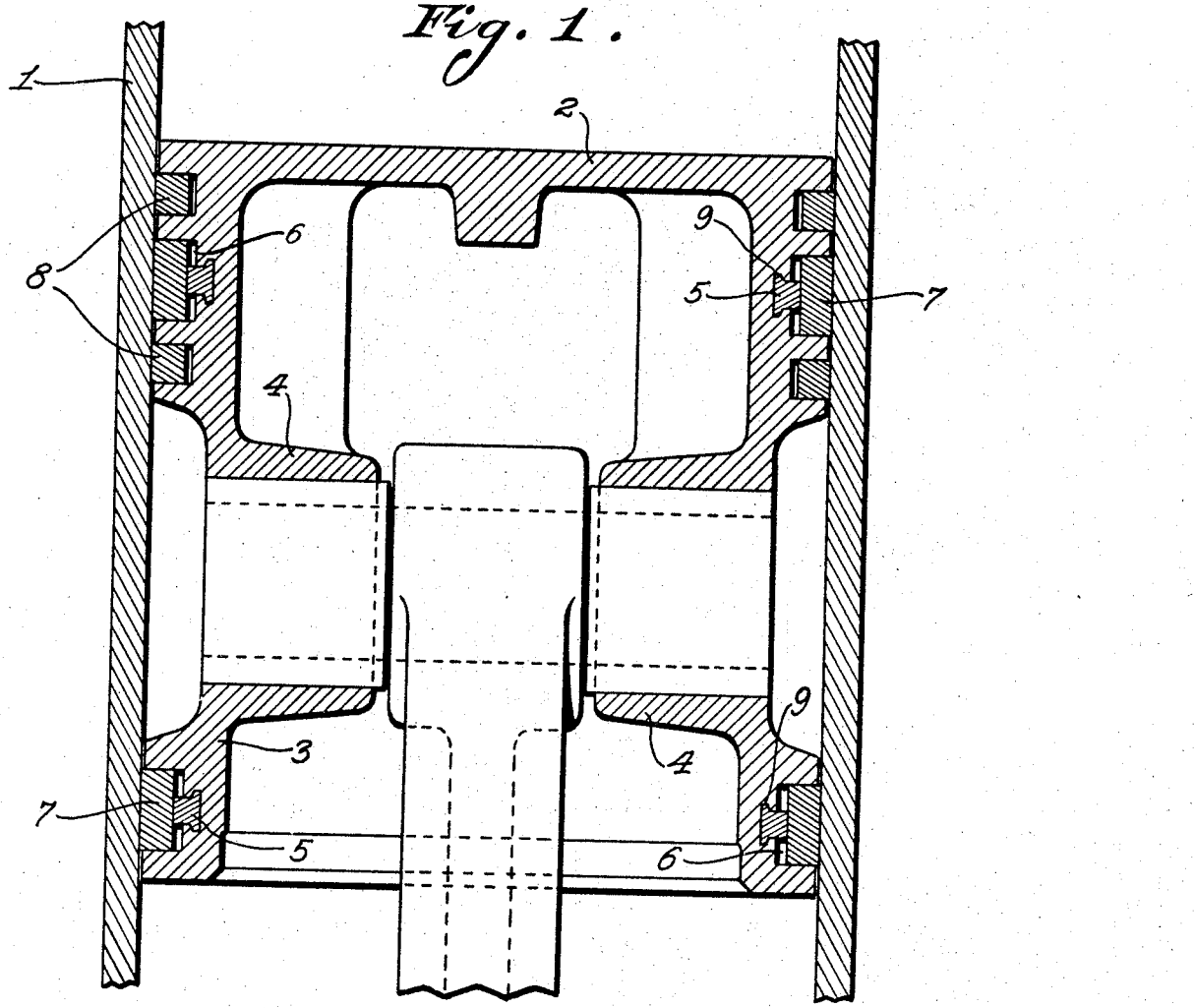
Figure 1 is an axial section of a trunk piston embodying this invention.
Figure 2:
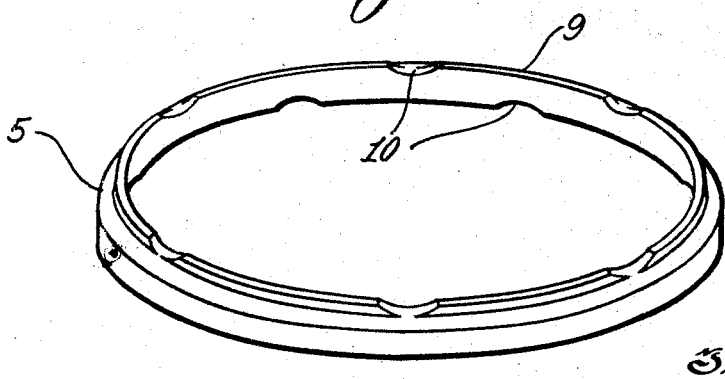
Figure 2 is a perspective view of the reinforcing ring.

Referring to the drawing, 1 designates the cylinder in which the piston is intended to work. The piston comprises a head 2, having a skirt 3 provided with the usual wrist-pin bosses 4. The body portion of the piston may be constructed of aluminum or its alloys, or of some other suitable material of light weight but high thermal expansion.

Such a piston is usually formed by casting. In accordance with the present invention, when the piston is cast one or more rings 5 of a non-expansible metal, are cast into the body of the piston. By non-expansible metal, as used herein, is meant a metal which has a coefficient of thermal expansion of substantially zero. A metal suitable for this purpose is invar steel. This metal is practically without an appreciable increase in size with increase in temperature. The rings 5 are cast into the body of the piston in such a position as to surround the body at such a portion thereof as to locate the ring at the bottom of a piston ring groove 6, which is undercut as illustrated in Figure 1. In the embodiment illustrated, there are two such rings 5, each located in but projecting beyond the bottom of the groove 6. The groove 6 is preferably made of ample width to accommodate a packing ring 7 of somewhat greater width longitudinally of the piston than is ordinarily used for packing rings. The ring 7 is formed so as to be of uniform thickness throughout its circumference and is dimensioned so that when seated upon the ring 5, as illustrated in Figure 1, it will fit the cylinder in such a manner as to provide a firm bearing for the piston against the cylinder wall. In the embodiment illustrated, such a ring 7 is provided at each end of the piston skirt.

It will be noted that the rings 7 are seated upon the rings 5. These rings are so proportioned that the rings 7 will have a proper sliding fit in the cylinder while resting upon the rings 5. The rings 7, therefore, provide a bearing of definite diameter to support the side thrust of the connecting rod during the operation of the engine. The rings 7 may be constructed of cast iron or other material suitable for piston rings. They are preferably split as is usual in piston packing rings, so as to be resilient circumferentially. This provides that the rings 7 will always exert a yielding pressure on the cylinder walls and so that they will expand as wear takes place.

Additional packing rings 8, fitted in piston ring grooves of the usual type, may also be provided for additional packing between a combustion chamber and the crankcase, and each of the grooves may have a bearing ring therein and at its base, although that is not necessary.

During the operation of the engine, as the piston heats up, the rings 5 will maintain their original size and will thereby limit expansion of the packing rings bearing at the points where the packing rings are applied. The piston skirt itself is machined to such a diameter (even at the ring bands) as to have ample clearance within the cylinder so that under no conditions of expansion will it be liable to contact with the cylinder wall or to bind therein. Since the supporting rings 5 maintain their diameter substantially constant, the packing rings 7, which are seated thereon and surround the same, will maintain a substantially constant bearing on the cylinder wall; in fact, the piston body is permitted to expand as the working temperature increases, while the supporting rings are maintained at a fixed diameter. It will, of course, be understood that the rings 5, after the piston body is cast therearound, are machined to the proper diameter; this diameter is such that, when a packing ring 7 is in place, as shown in Figure 1, and so as to bear against 5, the outside diameters of the packing rings as seated will correspond to the diameter of the cylinder. These packing rings will, however, project beyond the piston body so as to keep the same out of contact with the cylinder even when maximum expansion takes place; accordingly, the packing rings provide the bearing surfaces as well as sealing means; accordingly, the only expansion which will take place is that due to the packing rings, and since these are made of cast iron and since the thickness is small, the total radial expansion will be insignificant.

The rings 5 may be formed with outwardly extending base flanges 9 so as to anchor the same in the material of the piston body. The flanges 9 may be provided with notches or recesses 10 in which the casting metal may flow so as to further anchor the rings against rotary movement. This firm anchoring of the supporting rings 5 always results in proper seating, since the overhanging metal of the piston body extending over the flanges 9 prevents disengagement or looseness. As will be seen from Figure 1, the supporting rings 5 are not only embedded in the bottom of the grooves 6, but also project radially therebeyond. This, indeed, may be accomplished in the original casting so that the bottoms of the ring grooves 6 need not be machined, but it is only necessary to machine the outer circumferential faces of the rings 5.

It will be seen that this invention provides a piston which may be cast of light metal, irrespective of the degree of expansion which such metal may undergo upon heating. This is due to the fact that the bearing surfaces are formed by the packing rings seated on the supporting rings, which in turn are connected together and with the crank pin bosses by the body of the piston. The construction is such that the expense of manufacturing the piston is not increased. It is only necessary to place the rings 5 in the mold when the piston is cast. The rings 5 themselves are of simple and cheap construction. They may be accurately machined to size before placing them in the mold, and, accordingly, close dimensioning is possible.

It will further be noted that the entire wear to which the piston is subjected comes between the rings 7. The rings being loose and removable as an ordinary piston ring is, are renewable so that the effects of wear may be eliminated entirely. In view of the ease of replacement of the packing rings and in view of the fact that it is not necessary to now rely upon the piston body as a bearing surface, the same piston may be used for under and over sizes and even when the piston becomes worn. It is, therefore, not necessary to retain in stock an extended number of pistons as has been heretofore necessary.

While the invention is particularly applicable to trunk pistons for internal combustion engines, it is obvious that many of its features are capable of use in other pistons, etc. Furthermore, while the rings 5 are preferably of a substantially non-expansible material, such as invar steel, it is feasible to use even ordinary steel and still attain some of the objects of this invention, in view of the fact that the expansion is due only to the combined radial thicknesses of the rings 5 and 7. It is further obvious that various changes may be made, within the scope of the appended claims, in the details of construction without departing from the spirit of this invention; it is, therefore, to be understood that this invention is not to be limited to the specific details shown and described.

Having thus described the invention, what is claimed is:

1. A piston comprising, a body having a substantially non-expansible ring imbedded therein and below the outside cylindrical surface thereof to provide a substantially non-expansible packing ring seat.

2. A piston comprising, a body of expansible metal having a substantially non-expansible supporting ring imbedded therein and a packing ring seated on said supporting ring and projecting beyond said body, the diameter of said body being such as to remain within the diameter of the packing ring upon thermal expansion of the body.

3. A piston comprising a body of aluminum cast over a substantially non-expansible ring whose outer diameter is below the outside surface of the body to provide a substantially non-expansible packing ring seat.

4. A piston comprising a body of aluminum cast over a substantially non-expansible ring at the base of a packing groove in the body to provide a substantially non-expansible packing ring seat.

In testimony whereof I affix my signature this 14th day of June, 1927.

JOHN FLAMMANG.